(12) United States Patent
Kuramochi et al.

(10) Patent No.: US 8,624,438 B2
(45) Date of Patent: Jan. 7, 2014

(54) POWER SUPPLY UNIT AND ITS CONTROL DEVICE

(75) Inventors: Yuichi Kuramochi, Isesaki (JP);
 Hiroyuki Saito, Isesaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 111 days.

(21) Appl. No.: 13/238,567

(22) Filed: Sep. 21, 2011

(65) Prior Publication Data

US 2012/0068546 A1 Mar. 22, 2012

(30) Foreign Application Priority Data

Sep. 21, 2010 (JP) ................................. 2010-210755

(51) Int. Cl.
 *H02J 1/00* (2006.01)
(52) U.S. Cl.
 USPC ............................................................ 307/80
(58) Field of Classification Search
 USPC .................................................. 307/80, 150
 See application file for complete search history.

(56) References Cited

U.S. PATENT DOCUMENTS

| | | | |
|---|---|---|---|
| 6,992,490 B2 * | 1/2006 | Nomoto et al. | ............... 324/522 |
| 7,516,823 B2 | 4/2009 | Kikuchi et al. | |
| 8,208,235 B2 * | 6/2012 | Orchowski | ...................... 361/88 |
| 2006/0255746 A1 * | 11/2006 | Kumar et al. | ............. 315/209 R |
| 2007/0171684 A1 * | 7/2007 | Fukumoto | ................... 363/21.09 |
| 2011/0077828 A1 | 3/2011 | Matsuda et al. | |

FOREIGN PATENT DOCUMENTS

| | | |
|---|---|---|
| JP | 2008-182872 | 8/2008 |
| JP | 2008-238987 | 10/2008 |
| JP | 2009-254187 | 10/2009 |
| JP | 2009-293649 | 12/2009 |
| JP | 2010-156451 | 7/2010 |

OTHER PUBLICATIONS

Office Action in Japanese patent application Ser. No. 2010-210755, dispatched Sep. 18, 2012 (in Japanese, 2 pgs); [with English language translation, 2 pgs.].

* cited by examiner

*Primary Examiner* — Jared Fureman
*Assistant Examiner* — Duc M Pham
(74) *Attorney, Agent, or Firm* — Antonelli, Terry, Stout & Kraus, LLP.

(57) ABSTRACT

A control device is provided that includes a power supply unit. First and second MOSFETs are serially connected to a sub power supply line in the power supply unit by connecting their respective drains to one another. Third and fourth MOSFETs are serially connected to a sub power supply in a control unit by connecting their respective drains to one another. By controlling these MOSFETs, power of the sub power supply is supplied to a load. The drain voltage of each MOSFET, and the voltage between the second MOSFET and the third MOSFET are monitored to determine a short-circuit fault and an open-circuit fault of the MOSFET, and a ground fault in the sub power supply line between the power supply unit and the control unit.

18 Claims, 8 Drawing Sheets

FIG.4

| Time point | Diagnosis contents |
|---|---|
| t1 | SW1, SW2, SW3, SW4 OFF diagnosis (normal) |
| t2 | SW1, SW4 ON diagnosis (normal) |
| t3 | SW2, SW3 ON diagnosis (normal) |
| t4 | SW1, SW2 OFF diagnosis (SW1 or SW2 short-circuit) |
| t5 | SW1 ON diagnosis (SW1 open) |
| t6 | SW2 ON diagnosis (SW2 open) |
| t7 | SW3 ON diagnosis (SW3 open) |
| t8 | SW4 ON diagnosis (SW4 open) |
| t9 | SW3, SW4 OFF diagnosis (SW3 or SW4 short-circuit)) |

FIG.5

| | Time point | SW 1 | SW 2 | SW 3 | SW 4 | Cutout relay | SW1-SW2 voltage | SW3-SW4 voltage | Diagnosis contents |
|---|---|---|---|---|---|---|---|---|---|
| SW1 ON diagnosis | t2 | ON | OFF | – | – | ON | Sub power supply voltage | – | ON-operation OK |
| | t5 | ON | OFF | – | – | ON | $\phi$ | – | Open |
| SW1 OFF diagnosis | t1 | OFF | OFF | – | – | ON | $\phi$ | – | OFF-operation OK |
| | t4 | OFF | OFF | – | – | ON | Sub power supply voltage | – | Short-circuit |
| SW2 ON diagnosis | t3 | OFF | ON | – | – | ON | Bias voltage | – | ON-operation OK |
| | t6 | OFF | ON | – | – | ON | $\phi$ | – | Open |
| SW2 OFF diagnosis | t1 | OFF | OFF | – | – | ON | $\phi$ | – | OFF-operation OK |
| | t4 | OFF | OFF | – | – | ON | Bias voltage | – | Short-circuit |
| SW3 ON diagnosis | t3 | – | – | ON | OFF | ON | – | Bias voltage | ON-operation OK |
| | t7 | – | – | ON | OFF | ON | – | $\phi$ | Open |
| SW3 OFF diagnosis | t1 | – | – | OFF | OFF | ON | – | $\phi$ | OFF-operation OK |
| | t9 | – | – | OFF | OFF | ON | – | Bias voltage | Short-circuit |
| SW4 ON diagnosis | t2 | – | – | OFF | ON | ON | – | Main power supply voltage | ON-operation OK |
| | t8 | – | – | OFF | ON | ON | – | $\phi$ | Open |
| SW4 OFF diagnosis | t1 | – | – | OFF | OFF | ON | – | $\phi$ | OFF-operation OK |
| | t9 | – | – | OFF | OFF | ON | – | Main power supply voltage | Short-circuit |

POWER SUPPLY UNIT AND ITS CONTROL DEVICE

BACKGROUND OF THE INVENTION

1. Field of the Invention

The present invention relates to a power supply unit that supplies power to a load, and a control device including the power supply unit.

2. Description of Related Art

Japanese Laid-open Patent Publication No. 2009-254187 discloses a power supply unit that supplies power of a main power supply to an inverter via a main power supply line provided with a relay, and also supplies power of a sub power supply to the inverter via a sub power supply line provided with four semiconductor switches in series.

However, as in the power supply unit disclosed in the above publication, when four semiconductor switches are provided in a control unit, if a fault such as a ground fault occurs in a line for outputting an output of the sub power supply to the control unit side, protection of the sub power supply and detection of the fault cannot be performed sufficiently.

SUMMARY OF THE INVENTION

It is therefore an object of the present invention to provide a power supply unit that can protect power supply and detect a fault, with respect to a fault such as a ground fault in the output line of a power supply unit that includes a power supply, and a control device.

In order to achieve the above object, a power supply unit according to the present invention includes: a power supply; a power supply line that connects the power supply to a load; a first semiconductor switch serially connected to the power supply line by connecting a source thereof to the power supply; a second semiconductor switch serially connected to the power supply line by connecting a drain thereof to a drain of the first semiconductor switch; and a control unit that controls on/off of the first semiconductor switch and the second semiconductor switch, and monitors a drain voltage between the first semiconductor switch and the second semiconductor switch and a source voltage of the second semiconductor switch, to perform fault diagnosis.

Moreover, a control device according to the present invention includes a power supply unit and a control unit externally connected to the power supply unit.

The power supply unit includes:

a sub power supply;

a sub power supply line that connects the sub power supply to a load;

a first semiconductor switch serially connected to the sub power supply line by connecting a source thereof to the sub power supply;

a second semiconductor switch serially connected to the sub power supply line by connecting a drain thereof to a drain of the first semiconductor switch; and a sub control unit that controls on/off of the first semiconductor switch and the second semiconductor switch, and monitors a drain voltage between the first semiconductor switch and the second semiconductor switch and a source voltage of the second semiconductor switch, to perform fault diagnosis.

The control unit includes:

a sub power supply line connected to the sub power supply line of the power supply unit to connect the sub power supply to the load;

a third semiconductor switch serially connected to the sub power supply line by connecting a source thereof to the sub power supply;

a fourth semiconductor switch serially connected to the sub power supply line by connecting a drain thereof to a drain of the third semiconductor switch;

a main power supply line that connects a main power supply separate from the sub power supply to the load and is provided in parallel with the sub power supply line;

a relay provided in the main power supply line; and a main control unit that controls on/off of the relay, the third semiconductor switch, and the fourth semiconductor switch, and monitors a drain voltage between the third semiconductor switch and the fourth semiconductor switch and a source voltage of the third semiconductor switch, to perform fault diagnosis.

The other objects and features of this invention will become understood from the following description with reference to the accompanying drawings.

BRIEF DESCRIPTION OF THE DRAWINGS

FIG. 4 is a diagram of correlation between a diagnosis content and time of diagnosis in the control device according to the present invention;

FIG. 5 is a diagram of diagnostic logic in the control device according to the present invention;

DESCRIPTION OF THE PREFERRED EMBODIMENTS

Figure 1:
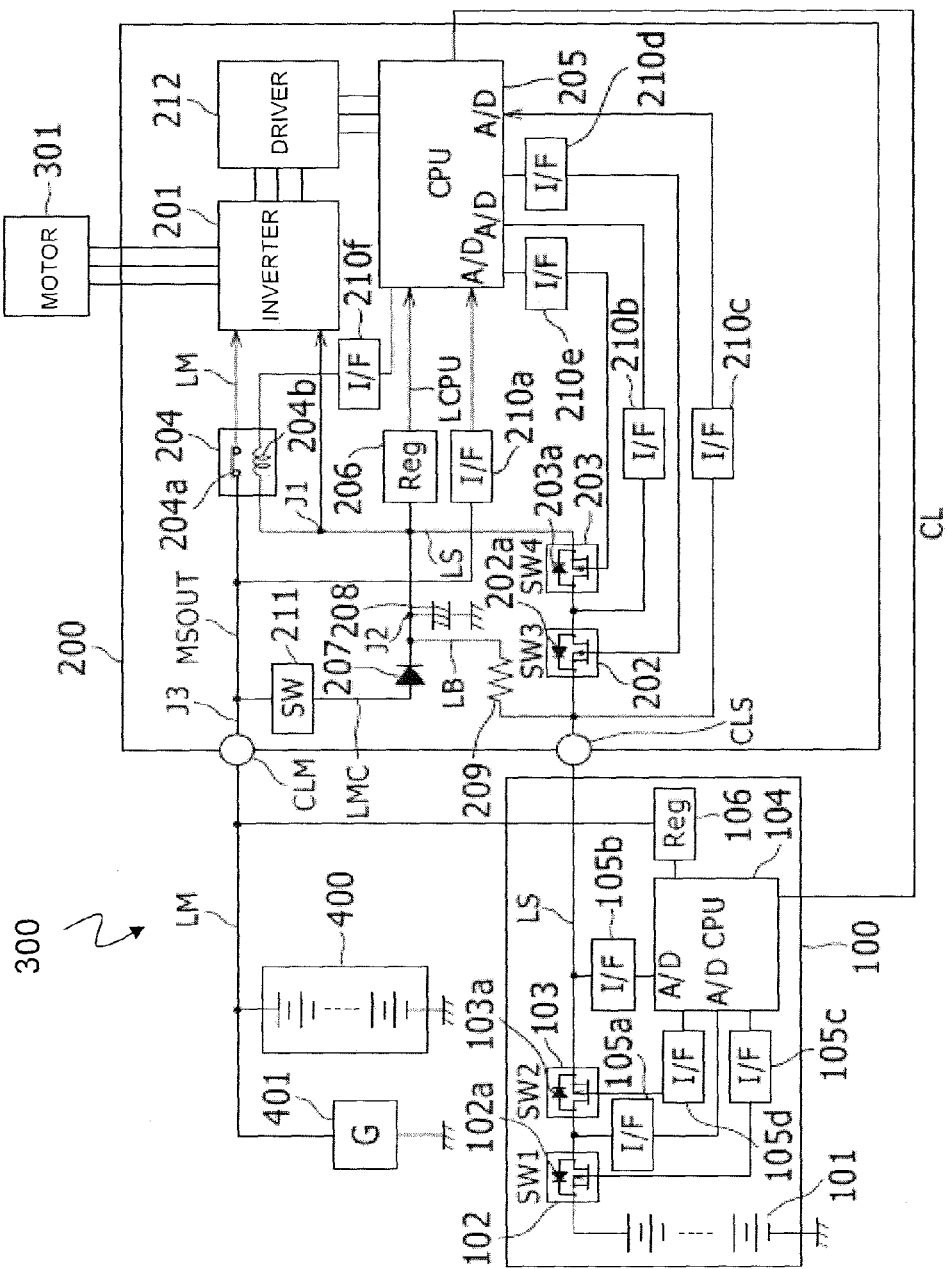
FIG. 1 is an overall configuration diagram of a control device according to the present invention.

FIG. 1 is an overall configuration diagram of a control device 300 including a power supply unit 100 equipped with a sub power supply 101, and a control unit 200 that supplies power from power supply unit 100 to an inverter 201.

A sub power supply line LS connected to sub power supply 101 incorporated in power supply unit 100 is connected to control unit 200, and a main power supply line LM connected to power supply unit 100 and a main power supply 400 separate from sub power supply 101 is also connected to control unit 200. Control unit 200 selectively supplies power from sub power supply 101 or main power supply 400 to inverter 201 as a load.

Main power supply 400 is a battery and is provided with a power generator 401 that charges main power supply 400. On the other hand, sub power supply 101 is constituted by a capacitor. However, sub power supply 101 can also be a battery including a power generator.

Inverter 201 is a motor inverter that drives an electric motor 301 such as a three-phase motor, and inverter 201 is controlled by a driver 212.

Electric motor 301 is, for example, an electric motor that generates a braking force by pressing a brake pad to a disk in an electric braking system of a vehicle (refer to Japanese Laid-open Patent Publication No. 2008-238987), an electric motor that drives an oil pump for supplying hydraulic oil pressure to a variable speed mechanism connected to an engine in a vehicle (refer to Japanese Laid-open Patent Publication No. 2009-293649), or an electric motor that drives a spool in a shift-by-wire system mounted on an automatic transmission (refer to Japanese Laid-open Patent Publication No. 2010-156451).

However, the combination of inverter 201 and electric motor 301 is not limited to the one equipped in the electric braking system of the vehicle or the variable speed mechanism. Moreover the load that performs power supply is not limited to the combination of inverter 201 and electric motor 301.

The load that supplies power may be, for example, a load used for a ship, a robot, a machine tool, or a video camera. Furthermore, the load may be one that consumes electric power energy, and can be a heater or a light source other than an electric actuator such as a motor.

Moreover, control unit 200 can be integrally fitted to a casing that houses electric motor 301. Furthermore, inverter 201 can be arranged outside of control unit 200, or inverter 201 and driver 212 can be arranged outside of control unit 200.

A first MOSFET 102 is serially connected to sub power supply line LS in power supply unit 100 by connecting a source thereof to sub power supply 101, and a second MOSFET 103 is serially connected to sub power supply line LS in power supply unit 100 by connecting a drain thereof to a drain of first MOSFET 102.

That is to say, the source of first MOSFET 102, the drain of first MOSFET 102, the drain of second MOSFET 103, and a source of second MOSFET 103 are connected in this order from sub power supply 101 toward inverter 201.

First MOSFET 102 and second MOSFET 103 serving as semiconductor switches are P-channel MOSFETs, which are turned on when a negative voltage is applied to a gate, so that electric current flows between the source and the drain, and include parasitic diodes 102a and 103a, respectively.

Parasitic diode 102a of first MOSFET 102 serving as the first semiconductor switch applies an electric current flowing from inverter 201 toward sub power supply 101, and parasitic diode 103a of second MOSFET 103 serving as the second semiconductor switch applies an electric current flowing from sub power supply 101 toward inverter 201.

Power supply unit 100 includes a microcomputer 104 including a CPU, a ROM, and a RAM serving as the sub control unit, and microcomputer 104 controls the gate voltage of first MOSFET 102 and second MOSFET 103, thereby controlling on/off of first MOSFET 102 and second MOSFET 103.

Furthermore microcomputer 104 analog-digital converts and reads the voltage in sub power supply line LS between first MOSFET 102 and second MOSFET 103, in other words, the drain voltage of first MOSFET 102 and second MOSFET 103.

Moreover, microcomputer 104 analog-digital converts and reads the source voltage of second MOSFET 103, in other words, the voltage in sub power supply line LS between second MOSFET 103 and a third MOSFET 202 described later.

Then microcomputer 104 diagnoses the presence of a short-circuit fault and an open-circuit fault in first MOSFET 102 and second MOSFET 103, and further, diagnoses the presence of a ground fault in sub power supply line LS between second MOSFET 103 and third MOSFET 202, based on the read voltage.

Microcomputer 104 performs monitoring of the voltage by A/D conversion, and on/off control of first MOSFET 102 and second MOSFET 103 via interfaces 105a, 105b, 105c, and 105d.

Moreover, power from main power supply 400 is supplied to microcomputer 104 from main power supply line LM via a regulator 106.

On the other hand, main power supply line LM connecting main power supply 400 and power generator 401 in parallel, and sub power supply line LS serially connecting sub power supply 101, first MOSFET 102, and second MOSFET 103 are detachably connected to control unit 200 via connectors CLM and CLS. Furthermore, in control unit 200, main power supply line LM and sub power supply line LS are mutually connected to inverter 201 in parallel.

Third MOSFET 202 is serially connected to sub power supply line LS between connector CLS and inverter 201, by connecting a source thereof to connector CLS, and a fourth MOSFET 203 is serially connected thereto by connecting a drain thereof to a drain of third MOSFET 202.

That is to say, the source of third MOSFET 202, the drain of third MOSFET 202, the drain of fourth MOSFET 203, and a source of fourth MOSFET 203 are connected in this order from connector CLS toward inverter 201.

Third MOSFET 202 and fourth MOSFET 203 serving as semiconductor switches are P-channel MOSFETs, which are turned on when a negative voltage is applied to the gate, as is the case with first MOSFET 102 and second MOSFET 103, so that electric current flows between the source and the drain, and include parasitic diodes 202a and 203a, respectively.

Parasitic diode 202a of third MOSFET 202 serving as the third semiconductor switch applies electric current flowing from inverter 201 toward sub power supply 101, and a parasitic diode 203a of fourth MOSFET 203 serving as the fourth semiconductor switch applies electric current flowing from sub power supply 101 toward inverter 201.

A relay 204 is serially connected to main power supply line LM between connector CLM and inverter 201, and an electromagnetic coil 204b that drives a contact 204a of relay 204 is interposed in a circuit branched from sub power supply line LS and reaching to microcomputer 205 in control unit 200. Microcomputer 205 controls energization/de-energization to electromagnetic coil 204b, that is, on/off of relay 204.

Microcomputer 205 serving as the main control unit includes a CPU, a ROM, and a RAM, and controls inverter 201 via driver 212. Moreover, microcomputer 205 controls on/off of relay 204. Furthermore, microcomputer 205 controls the applied voltage of the gates of third MOSFET 202 and fourth MOSFET 203, thereby controlling on/off of third MOSFET 202 and fourth MOSFET 203.

A power supply line LCPU for supplying operating power to microcomputer 205 is branched from sub power supply line LS between fourth MOSFET 203 and a connection point J1 of a circuit including electromagnetic coil 204b. A regulator 206 is interposed in power supply line LCPU.

Moreover, a power supply line LMC that connects main power supply line LM between connector CLM and relay 204 to sub power supply line LS between fourth MOSFET 203 and connection point J1 of the circuit including electromagnetic coil 204b is provided.

A switch SW211 and a diode 207 are serially connected to power supply line LMC, and a capacitor 208 is connected in parallel between diode 207 and sub power supply line LS.

Consequently, power of main power supply 400 is supplied to microcomputer 205 via switch SW211 and diode 207, and power of main power supply 400 is accumulated in capacitor 208. Consequently, even if power supply from main power supply 400 is lost, the operation of microcomputer 205 can be continued by the power accumulated in capacitor 208. Moreover, power of sub power supply 101 can be supplied to microcomputer 205 via sub power supply line LS.

For example, when inverter 201 is an inverter provided in a vehicle, switch SW211 is a main switch operated by a driver of the vehicle. When switch SW211 is turned on, power of main power supply 400 is supplied to microcomputer 205, and microcomputer 205 is started.

Diode 207 prevents the power accumulated in capacitor 208 from flowing into main power supply line LM.

Furthermore a bias voltage application line LB that connects a connection point J2 between diode 207 and capacitor 208 to sub power supply line LS between connector CLS and third MOSFET 202 is also provided. A resistance 209 is interposed in bias voltage application line LB.

A bias voltage lower than the voltage of main power supply 400 is applied to sub power supply line LS between second MOSFET 103 and third MOSFET 202 by resistance 209 provided in bias voltage application line LB.

Microcomputer 205 analog-digital converts and reads the voltage in sub power supply line LS between third MOSFET 202 and fourth MOSFET 203, in other words, the drain voltage of third MOSFET 202 and fourth MOSFET 203. Furthermore microcomputer 205 analog-digital converts and reads the voltage in sub power supply line LS between connector CLS and third MOSFET 202, in other words, the source voltage of third MOSFET 202. Then microcomputer 205 diagnoses the presence of a short-circuit fault and an open-circuit fault in third MOSFET 202 and fourth MOSFET 203, based on the read voltage.

Furthermore, microcomputer 205 analog-digital converts and reads the voltage of main power supply line LM between a branch point J3 of power supply line LMC and relay 204, that is, the voltage of main power supply 400. Then, microcomputer 205 determines which of main power supply 400 and sub power supply 101 is to be used as a power supply for inverter 201, based on the voltage of main power supply 400.

Microcomputer 205 performs voltage monitoring by A/D conversion, on/off control of third MOSFET 202 and fourth MOSFET 203, and on/off control of relay 204 via interfaces 210a, 210b, 210c, 210d, 210e, and 210f.

Furthermore, a communication line CL that connects microcomputer 205 of control unit 200 to microcomputer 104 of power supply unit 100 is provided, so that microcomputer 205 and microcomputer 104 can communicate with each other via communication line CL.

Microcomputer 205 turns off relay 204 at the time of voltage drop of main power supply 400 due to a fault in main power supply line LM, thereby disconnecting between main power supply 400 and inverter 201. Moreover, microcomputer 205 performs control to turn on third MOSFET 202 and fourth MOSFET 203, and outputs an ON command of first MOSFET 102 and second MOSFET 103 to microcomputer 104. Consequently, all of first MOSFET 102, second MOSFET 103, third MOSFET 202, and fourth MOSFET 203 are controlled to be turned on, and power of sub power supply 101 is supplied to inverter 201.

Here, for example, if only one MOSFET serving as a semiconductor switch is provided in sub power supply line LS, then even if the MOSFET is controlled to be turned off, the power of sub power supply 101 flows out, or the power of main power supply 400 flows into sub power supply 101 via the parasitic diode.

However, as in the present embodiment, when a pair of MOSFETs are serially connected to sub power supply line LS so as to connect the drains thereof with each other, the direction of the respective parasitic diodes are inverted, and the flow of electric current in one of the parasitic diodes is blocked by the other parasitic diode. Accordingly, even if the MOSFET includes the parasitic diode, outflow of power from sub power supply 101 via the parasitic diode is suppressed, or inflow of power from main power supply 400 into sub power supply 101 is suppressed, thereby enabling to protect sub power supply 101.

Specifically, electric current flowing out from power supply unit 100 flows in the parasitic diodes of second MOSFET 103 and fourth MOSFET 203. However, in the case of a single power supply unit 100, the parasitic diode of first MOSFET 102 blocks outflow of power from sub power supply 101.

Moreover, in a state with control unit 200 and power supply unit 100 being connected with each other, the parasitic diodes of first MOSFET 102 and third MOSFET 202 block outflow of power from sub power supply 101. Consequently, even if any one of first MOSFET 102 and third MOSFET 202 is short-circuited, outflow of power from sub power supply 101 can be suppressed.

Furthermore, inflow power from main power supply 400 to sub power supply 101 via inverter 201 flows in the parasitic diodes of first MOSFET 102 and third MOSFET 202. However, inflow power into sub power supply 101 is blocked by the parasitic diodes of second MOSFET 103 and fourth MOSFET 203. Consequently, even if any one of second MOSFET 103 and fourth MOSFET 203 is short-circuited, inflow of power from main power supply 400 into sub power supply 101 via the inverter can be suppressed.

Moreover, if a pair of MOSFETs is provided on both sides of power supply unit 100 and control unit 200, a single power supply unit 100 can protect sub power supply 101. Furthermore, when power supply unit 100 and control unit 200 are combined, even if any one of the four MOSFETs is short-circuited, generation of outflow or inflow of power between sub power supply 101 and main power supply 400 can be suppressed.

Figure 2:
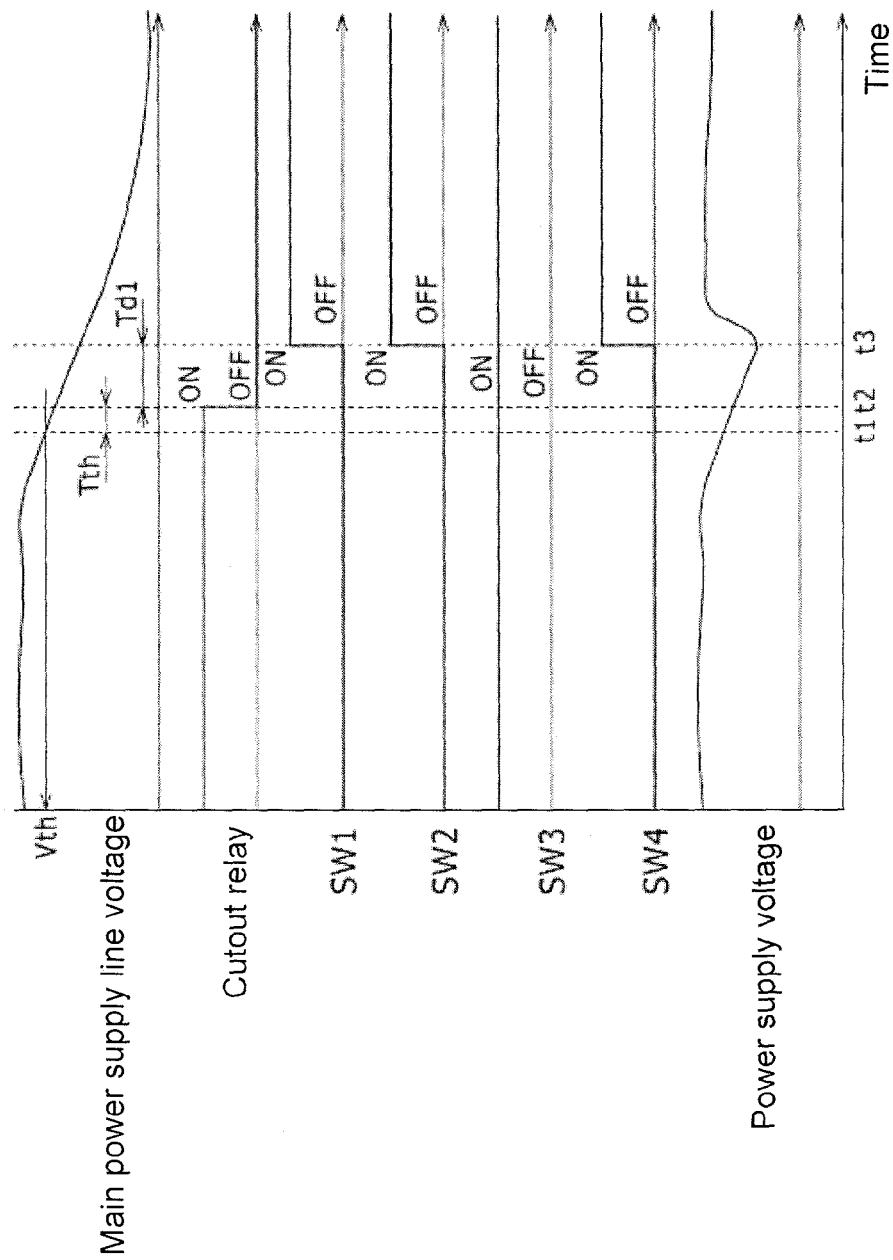
FIG. 2 is a timing chart of a switching operation from a main power supply to a sub power supply in the control device according to the present invention.

FIG. 2 is a timing chart showing the on/off control of the MOSFET when a ground fault occurs in a main power supply output line MSOUT, which is main power supply line LM positioned closer to main power supply 400 than relay 204.

Microcomputer 205 monitors the voltage VM of main power supply line LM by an A/D converter incorporated therein. When determined that voltage VM of main power supply line LM is lower than a set voltage Vth at time point t1, microcomputer 205 starts measurement of duration time in a state with voltage VM being lower than the set voltage Vth.

When detected that the duration time has reached set time Tth (Tth=t2−t1) at time point t2, microcomputer 205 presumes that a fault such as a ground fault has occurred in the main power supply output line MSOUT. When microcomputer 205 diagnoses the occurrence of the ground fault in the main power supply output line MSOUT, microcomputer 205 turns off relay 204, and outputs a command signal requesting power supply from sub power supply 101 to microcomputer 104 of power supply unit 100.

The set voltage Vth is set to a voltage not lower than the lowest operating voltage of microcomputer 205. Moreover, the set time Tth is set such that even if a drop in voltage VM of main power supply line LM is left uncontrolled by the set time Vth to maintain relay 204 in the on-state, microcomputer 205 can continue the operation by the power accumulated in capacitor 208.

Microcomputer 205 controls third MOSFET 202 and fourth MOSFET 203 to be turned on after passage of operation delay time Td1 from after relay 204 is controlled to be turned off until relay 204 is actually turned off, and outputs an on-command of first MOSFET 102 and second MOSFET 103 to microcomputer 104 of power supply unit 100.

By providing the delay time Td1, a situation in which power of sub power supply 101 is supplied to inverter 201 before relay 204 is actually turned off is suppressed. Consequently, a situation in which power of sub power supply 101 flows into a grounded portion in main power supply line LM, needlessly consuming power of sub power supply 101 is suppressed.

Here, if third MOSFET 202 is held in the on-state from a state in which the voltage of main power supply line LM is normal and power of main power supply 400 is being supplied to inverter 201, power of sub power supply 101 can be supplied to inverter 201 via between the source and the drain of third MOSFET 202 held in the on-state, and via parasitic diode 203a of fourth MOSFET 203.

That is to say, if third MOSFET 202 is held in the on-state, then even if fourth MOSFET 203 has not yet been switched over to the on-state at the point in time when the power supply from sub power supply 101 is enabled on power supply unit 100 side, supply of power from sub power supply 101 to inverter 201 can be started. Consequently, response to switchover from main power supply 400 to sub power supply 101 can be accelerated, and hence, a drop in voltage to be supplied to inverter 201 can be reduced.

On the other hand, if the voltage VM of main power supply line LM is normal, microcomputer 104 holds first MOSFET 102 and second MOSFET 103 both in an off-state. Consequently, even if sub power supply line LS between power supply unit 100 and control unit 200 is grounded, a situation in which the power of sub power supply 101 flows into the grounded portion via parasitic diode 103a can be blocked by parasitic diode 102a.

Next is a detailed description of diagnosis of the short-circuit fault and open-circuit fault in first MOSFET 102, second MOSFET 103, third MOSFET 202, and fourth MOSFET 203, and diagnosis of the ground fault in sub power supply line LS between second MOSFET 103 and third MOSFET 202.

The fault diagnosis can be performed, for example, when the power is supplied to microcomputer 205 of control unit 200 to start up microcomputer 205, and furthermore, can be regularly executed in a state with the voltage of main power supply line LM being normal.

Moreover, in the on/off control of MOSFETs 102, 103, 202, and 203 for fault diagnosis, microcomputer 205 controls on/off of MOSFETs 202 and 203, and microcomputer 104 performs on/off control of MOSFETs 102 and 103 upon reception of a command from microcomputer 205.

Figure 3:
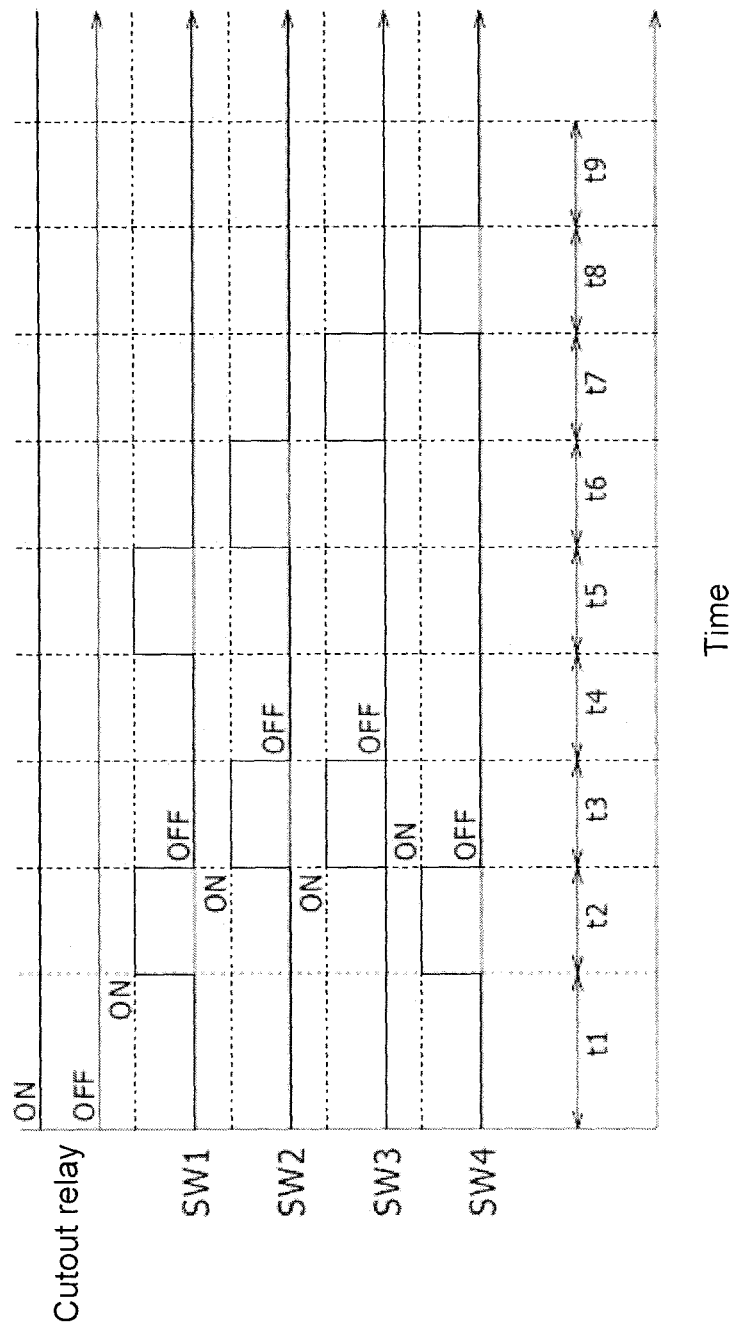
FIG. 3 is a timing chart of an on/off control pattern of a MOSFET for diagnosis in the control device according to the present invention.

In the on/off control of MOSFETs 102, 103, 202, and 203 for fault diagnosis, for example, as shown in FIG. 3, on/off of MOSFETs 102, 103, 202, and 203 is switched over for each predetermined time in a preset pattern, and diagnosis can be performed by sequentially switching over a portion to be diagnosed and a portion for monitoring the voltage, according to which one of MOSFETs 102, 103, 202, and 203 is turned on.

FIG. 4 shows a diagnosis content at each timing point, when MOSFETs 102, 103, 202, and 203 are on/off-controlled in the pattern shown in FIG. 3. FIG. 5 shows a correlation among; on/off control pattern of the MOSFET for diagnosis, diagnosis target, diagnosis result, and diagnosis timing. Hereunder, the fault diagnosis will be explained in detail with reference to FIG. 3, FIG. 4, and FIG. 5.

[Diagnosis of Ground Fault in Sub Power Supply Line LS]

Here diagnosis of a ground fault in sub power supply line LS is explained.

If all MOSFETs 102, 103, 202, and 203 are turned off, a bias voltage is generated in sub power supply line LS between second MOSFET 103 and third MOSFET 202.

Therefore, in a state with all MOSFETs 102, 103, 202, and 203 being turned off, that is, at time point t1 and/or time point t9 in FIG. 3, microcomputers 104 and 205 respectively monitor the voltage of sub power supply line LS between second MOSFET 103 and third MOSFET 202. Microcomputers 104 and 205 determine that a ground fault has occurred when voltage is not generated in sub power supply line LS between second MOSFET 103 and third MOSFET 202. When a voltage corresponding to the bias voltage is generated in sub power supply line LS between second MOSFET 103 and third MOSFET 202, microcomputers 104 and 205 determine that there is no ground fault.

Even when a ground fault has occurred in sub power supply line LS between second MOSFET 103 and third MOSFET 202, inflow of power from main power supply 400 and sub power supply 101 into a grounded portion can be prevented by first MOSFET 102 and fourth MOSFET 203. However, when a ground fault has occurred in sub power supply line LS between second MOSFET 103 and third MOSFET 202, power of sub power supply 101 cannot be supplied to inverter 201. Consequently, microcomputers 104 and 205 restrict the on control of MOSFETs 102, 103, 202, and 203, and cause a warning device such as a lamp to operate for warning that it is in a state in which power of sub power supply 101 cannot be supplied to inverter 201.

Moreover, when a ground fault has occurred in sub power supply line LS between second MOSFET 103 and third MOSFET 202 and power of sub power supply 101 cannot be supplied to inverter 201, microcomputers 104 and 205 can ensure power for inverter 201 by restricting supply of power from main power supply 400 to a load other than inverter 201 or by increasing production of power in power generator 401.

Here microcomputers 104 and 105 respectively transmit a diagnosis result indicating whether a ground fault has occurred in sub power supply line LS between second MOSFET 103 and third MOSFET 202, to the other party side. When the occurrence of a ground fault is determined at least in one of the own diagnosis and the diagnosis on the other party side, it is desired to restrict the on control of the MOSFETs.

[Fault Diagnosis of First MOSFET 102]

Here, fault diagnosis of first MOSFET 102 in power supply unit 100 is explained.

As described above, MOSFETs 102, 103, 202, and 203 are connected from sub power supply 101 toward regulator 206, in order of; the source, drain, drain, source, source, drain, drain, and source.

Therefore, the voltage of sub power supply 101 is constantly applied to the source of first MOSFET 102, and in a normal state of first MOSFET 102, when first MOSFET 102 is turned off, voltage is not generated on the drain side of first MOSFET 102.

Consequently, microcomputer 104 monitors voltage between first MOSFET 102 and second MOSFET 103 in the off-state of MOSFETs 102 and 103, that is, at time point t1 and/or time point t4 in FIG. 3. When the voltage between first MOSFET 102 and second MOSFET 103 is lower than a reference voltage VS (VS>0), which is lower than the voltage of sub power supply 101, microcomputer 104 determines that first MOSFET 102 is normally turned off.

On the other hand, when the voltage between first MOSFET 102 and second MOSFET 103 is greater than the reference voltage VS, microcomputer 104 determines that a short-circuit fault has occurred in first MOSFET 102.

Diagnosis of the short-circuit fault is performed as shown in "SW1-OFF diagnosis" in FIG. 5 at time point t1 and time point t4 in FIG. 4.

A short-circuit of the MOSFET is a fault in which electric current flows between the source and the drain regardless of the gate voltage.

Even if a short-circuit fault has occurred in first MOSFET 102, inflow of power from main power supply 400 into sub power supply 101 can be prevented by second MOSFET 103 and fourth MOSFET 203. Furthermore outflow of power from sub power supply 101 to main power supply 400 can be prevented by performing off-control of third MOSFET 202.

Moreover it can be diagnosed whether first MOSFET 102 is normally turned on by monitoring the drain voltage of first MOSFET 102 at the time of turning on first MOSFET 102 in a state with at least second MOSFET 103 being turned off, that is, at time point t2 and/or time point t5 in FIG. 3.

When first MOSFET 102 is turned on, if a voltage corresponding to the voltage of sub power supply 101 is generated on the drain side of first MOSFET 102, it means that first MOSFET 102 is normally turned on. In contrast, when first MOSFET 102 is turned on, if a voltage is not generated on the drain side of first MOSFET 102, microcomputer 104 determines that there is an open-circuit fault in first MOSFET 102.

The open-circuit fault in the MOSFET is a fault in which electric current does not flow between the source and the drain even if the MOSFET is controlled to be turned on.

That is to say, when first MOSFET 102 is in the on-controlled state and the voltage on the drain side of first MOSFET 102 is greater than the reference voltage VS, microcomputer 104 diagnoses that first MOSFET 102 is normally turned on. Moreover, when first MOSFET 102 is in the on-controlled state and the voltage on the drain side of first MOSFET 102 is lower than the reference voltage VS, microcomputer 104 determines that there is an open-circuit fault in first MOSFET 102.

Diagnosis of the open-circuit fault is performed as shown in "SW1-ON diagnosis" in FIG. 5 at time point t2 and time point t5 in FIG. 4.

In the state with first MOSFET 102 having an open-circuit fault, power of sub power supply 101 cannot be supplied to inverter 201. Therefore microcomputer 104 holds first MOSFET 102 and second MOSFET 103 in the off-state, outputs a signal requesting to hold MOSFETs 202 and 203 in the off-state, to microcomputer 205, so that all MOSFETs are held in the off-state, and warns that power supply from sub power supply 101 is not possible.

[Fault Diagnosis of Second MOSFET 103]

Here, fault diagnosis of second MOSFET 103 in power supply unit 100 is explained.

In the off-state of first, third, and fourth MOSFETs 102, 202, and 203, a bias voltage is generated in the source of second MOSFET 103.

Therefore, in the off-state of first, third, and fourth MOSFETs 102, 202, and 203, if second MOSFET 103 is normally turned on, a voltage is not generated on the drain side of second MOSFET 103.

Consequently, microcomputer 104 monitors the drain voltage of second MOSFET 103 in the off-state of first MOSFET 102 and second MOSFET 103, that is, at time point t1 and/or time point t4 in FIG. 3. When the drain voltage of second MOSFET 103 is lower than a reference voltage VBS (VBS>0), which is lower than the bias voltage, microcomputer 104 determines that second MOSFET 103 is normally turned off.

On the other hand, when the drain voltage of second MOSFET 103 is greater than the reference voltage VBS with second MOSFET 103 in the off-controlled state, it means that second MOSFET 103 is actually turned on in the off-controlled state. Hence, microcomputer 104 determines that there is a short-circuit fault in second MOSFET 103.

Diagnosis of the short-circuit fault is performed as shown in "SW2-OFF diagnosis" in FIG. 5 at time point t1 and time point t4 in FIG. 4.

Even if a short-circuit fault has occurred in second MOSFET 103, inflow of power from main power supply 400 into sub power supply 101 can be prevented by fourth MOSFET 203. Furthermore outflow of power from sub power supply 101 to main power supply 400 can be prevented by performing off-control of first MOSFET 102 and third MOSFET 202.

Subsequently, as shown at time point t3 and/or time point t6 in FIG. 3, in the off-state of first MOSFET 102 and fourth MOSFET 203, second MOSFET 103 is turned on. At this time, a bias voltage is generated at the drain of second MOSFET 103. Therefore, it can be determined that second MOSFET 103 is normally turned on when the drain voltage of second MOSFET 103 is greater than the reference voltage VBS.

On the other hand, when the drain voltage of second MOSFET 103 is lower than the reference voltage VBS even if second MOSFET 103 is turned on, microcomputer 104 determines that there is an open-circuit fault in second MOSFET 103.

Diagnosis of the open-circuit fault is performed as shown in "SW2-ON diagnosis" in FIG. 5 at time point t3 and time point t6 in FIG. 4.

In the state with second MOSFET 103 having an open-circuit fault, parasitic diode 103a of second MOSFET 103 causes electric current to flow from sub power supply 101 toward inverter 201. However, if a load current is caused to flow continuously to parasitic diode 103a, there may be a problem in that second MOSFET 103 is overheated. Therefore, it is desired to hold all of first, second, third, and fourth MOSFETs 102, 103, 202, and 203 in the off-state in a state with second MOSFET 103 having an open-circuit fault, to restrict supply of power from sub power supply 101 to inverter 201.

[Fault Diagnosis of Third MOSFET 202]

Here, fault diagnosis of third MOSFET 202 in control unit 200 is explained.

In the off-state of first, second, and fourth MOSFETs 102, 103, and 203, a bias voltage is generated in the source of third MOSFET 202.

Therefore, in the off-state of first, second, and fourth MOSFETs 102, 103, and 203, if third MOSFET 202 is normally turned on, a voltage is not generated on the drain side of third MOSFET 202.

Consequently, microcomputer 104 monitors the drain voltage of third MOSFET 202 in the off-state of all of first, second, third, and fourth MOSFETs 102, 103, 202, and 203, that is, at time point t1 and/or time point t9 in FIG. 3. When the drain voltage of third MOSFET 202 is lower than the reference voltage VBS, microcomputer 104 determines that third MOSFET 202 is normally turned off.

On the other hand, when the drain voltage of third MOSFET 202 is greater than the reference voltage VBS with third MOSFET 202 in the off-controlled state, it means that third MOSFET 202 is actually turned on in the off-controlled state. Hence, microcomputer 205 determines that there is a short-circuit fault in third MOSFET 202.

Diagnosis of the short-circuit fault is performed as shown in "SW3-OFF diagnosis" in FIG. 5 at time point t1 and time point t9 in FIG. 4.

When third MOSFET 202 has a short-circuit fault, outflow of power from sub power supply 101 toward main power supply 400 can be blocked by first MOSFET 102, and power can be supplied to inverter 201 from either sub power supply 101 or main power supply 400.

As shown at time point t3 and/or time point t7 in FIG. 3, when first MOSFET 102 and fourth MOSFET 203 are turned off, if third MOSFET 202 is turned on, a bias voltage is generated at the drain of third MOSFET 202. Consequently, when the drain voltage of third MOSFET 202 is greater than the reference voltage VBS, microcomputer 205 determines that third MOSFET 202 is normally turned on.

On the other hand, when the drain voltage of third MOSFET 202 is lower than the reference voltage VBS even if third MOSFET 202 is turned on, microcomputer 104 determines that there is an open-circuit fault in third MOSFET 202.

Diagnosis of the open-circuit fault is performed as shown in "SW3-ON diagnosis" in FIG. 5 at time point t3 and time point t7 in FIG. 4.

When third MOSFET 202 has an open-circuit fault, even if first MOSFET 102, second MOSFET 103, third MOSFET 202, and fourth MOSFET 203 are all turned on, power of sub power supply 101 cannot be supplied to inverter 201.

Consequently, microcomputer 205 restricts on-control of third MOSFET 202 and fourth MOSFET 203, and outputs a signal requesting to restrict on-control of first MOSFET 102 and second MOSFET 103 to microcomputer 104. As a result, the on-control of first MOSFET 102, second MOSFET 103, third MOSFET 202, and fourth MOSFET 203 is restricted.

Moreover, microcomputer 205 warns of generation of a fault such that power of sub power supply 101 cannot be supplied to inverter 201, by operating the warning device.

[Fault Diagnosis of Fourth MOSFET 203]

Here, fault diagnosis of fourth MOSFET 203 in the control unit 203 is explained.

The voltage of main power supply 400 is constantly applied to the source of fourth MOSFET 203 via relay 204. Consequently, when fourth MOSFET 203 is normally turned off, a voltage is not generated on the drain side of fourth MOSFET 203.

Therefore, when first MOSFET 102, second MOSFET 103, third MOSFET 202, and fourth MOSFET 203 are all in the off-controlled state, that is, at time point t1 and/or time point t9 in FIG. 3, if the drain voltage of fourth MOSFET 203 is lower than the reference voltage VMS, which is lower than the voltage of main power supply 400, microcomputer 205 determines that fourth MOSFET 203 is normally turned off.

On the other hand, when the drain voltage of fourth MOSFET 203 is greater than the reference voltage VMS, it means that electric current is flowing between the source and the drain of fourth MOSFET 203 even if fourth MOSFET 203 is off-controlled. Hence, microcomputer 205 determines that there is a short-circuit fault in fourth MOSFET 203.

Diagnosis of the short-circuit fault is performed as shown in "SW4-OFF diagnosis" in FIG. 5 at time point t1 and time point t9 in FIG. 4.

When fourth MOSFET 203 has a short-circuit fault, inflow of power from main power supply 400 to sub power supply 101 can be blocked by second MOSFET 103. Consequently, power can be supplied to inverter 201 from either sub power supply 101 or main power supply 400.

Moreover it can be confirmed whether fourth MOSFET 203 is normally turned on by monitoring the drain voltage of fourth MOSFET 203 in a state with third MOSFET 202 being off-controlled and fourth MOSFET 203 being on-controlled, that is, at time point t2 and/or time point t8 in FIG. 3.

That is to say, at the time of turning on fourth MOSFET 203, when the drain voltage of fourth MOSFET 203 is greater than the reference voltage VMS, microcomputer 205 determines that fourth MOSFET 203 is normally turned on.

On the other hand, even if fourth MOSFET 203 is on-controlled, when the drain voltage of fourth MOSFET 203 is lower than the reference voltage VMS, microcomputer 205 determines that there is an open-circuit fault in fourth MOSFET 203.

In a state with fourth MOSFET 203 having the open-circuit fault, parasitic diode 203a of fourth MOSFET 203 causes electric current to flow from sub power supply 101 toward inverter 201. However, if a load current is caused to flow continuously to parasitic diode 203a, there may be a problem in that fourth MOSFET 203 is overheated. Therefore, it is desired to hold all of first MOSFET 102, second MOSFET 103, third MOSFET 202, and fourth MOSFET 203 in the off-state in the state with fourth MOSFET 203 having an open-circuit fault, to restrict supply of power from sub power supply 101 to inverter 201.

As described above, it is diagnosed if there is a short-circuit fault or an open-circuit fault in first MOSFET 102, second MOSFET 103, third MOSFET 202, and fourth MOSFET 203. Moreover, it is diagnosed if there is a ground fault in sub power supply line LS between second MOSFET 103 and third MOSFET 202.

Accordingly, a situation in which first MOSFET 102, second MOSFET 103, third MOSFET 202, and fourth MOSFET 203 are on-controlled, although power of sub power supply 101 cannot be actually supplied to inverter 201 can be suppressed. Moreover, sub power supply 101 and main power supply 400 can be protected.

In the present embodiment, a circuit for applying a bias voltage to sub power supply line LS between second MOSFET 103 and third MOSFET 202, that is, bias voltage application line LB including resistance 209, is provided on control unit 200 side. However, as shown in FIG. 6 or FIG. 7, a circuit for applying a bias voltage to sub power supply line LS between second MOSFET 103 and third MOSFET 202 can be provided on power supply unit 100 side.

Figure 6:
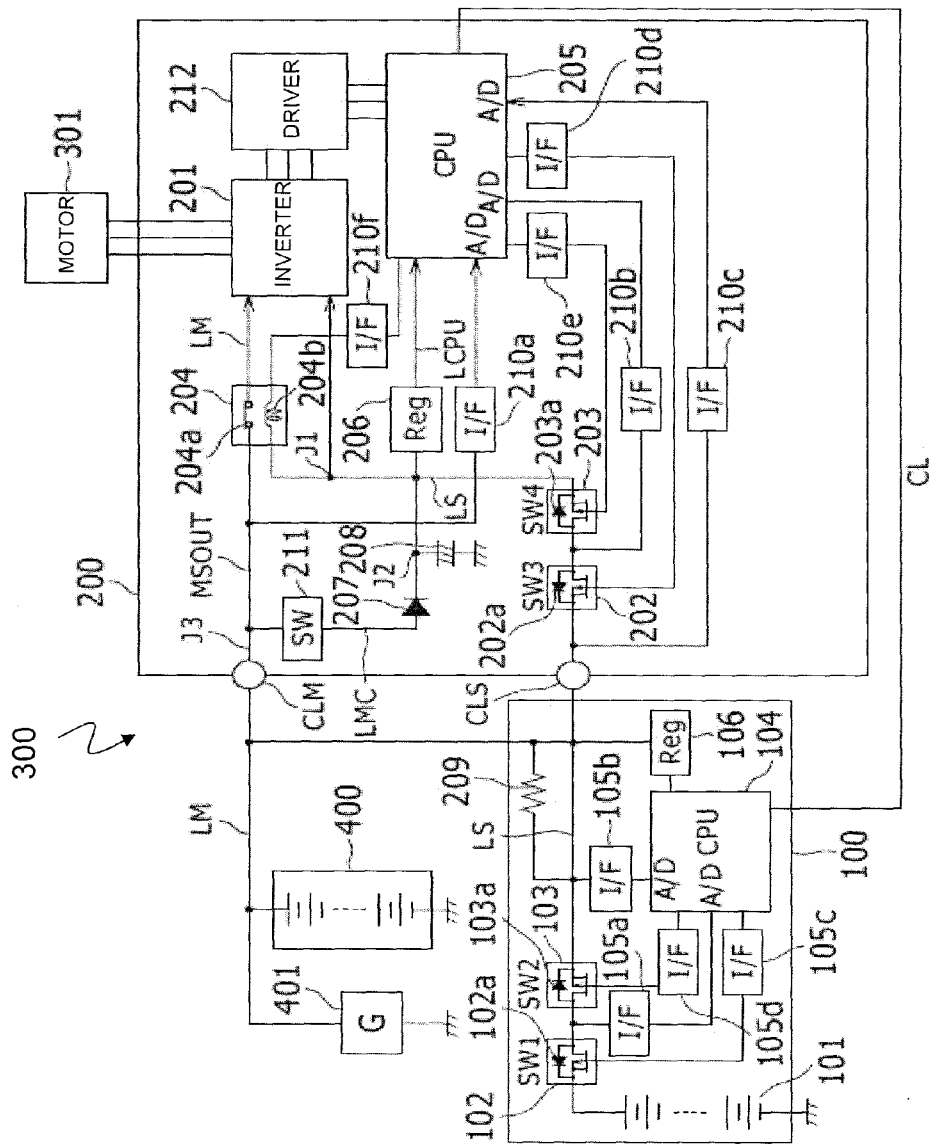
FIG. 6 is a diagram of a modification example of the control device according to the present invention.

In the control device shown in FIG. 6, main power supply line LM and the sub power supply LS between connector CLS and second MOSFET 103 are connected via resistance 209, to apply a bias voltage to sub power supply line LS between second MOSFET 103 and third MOSFET 202.

Figure 7:
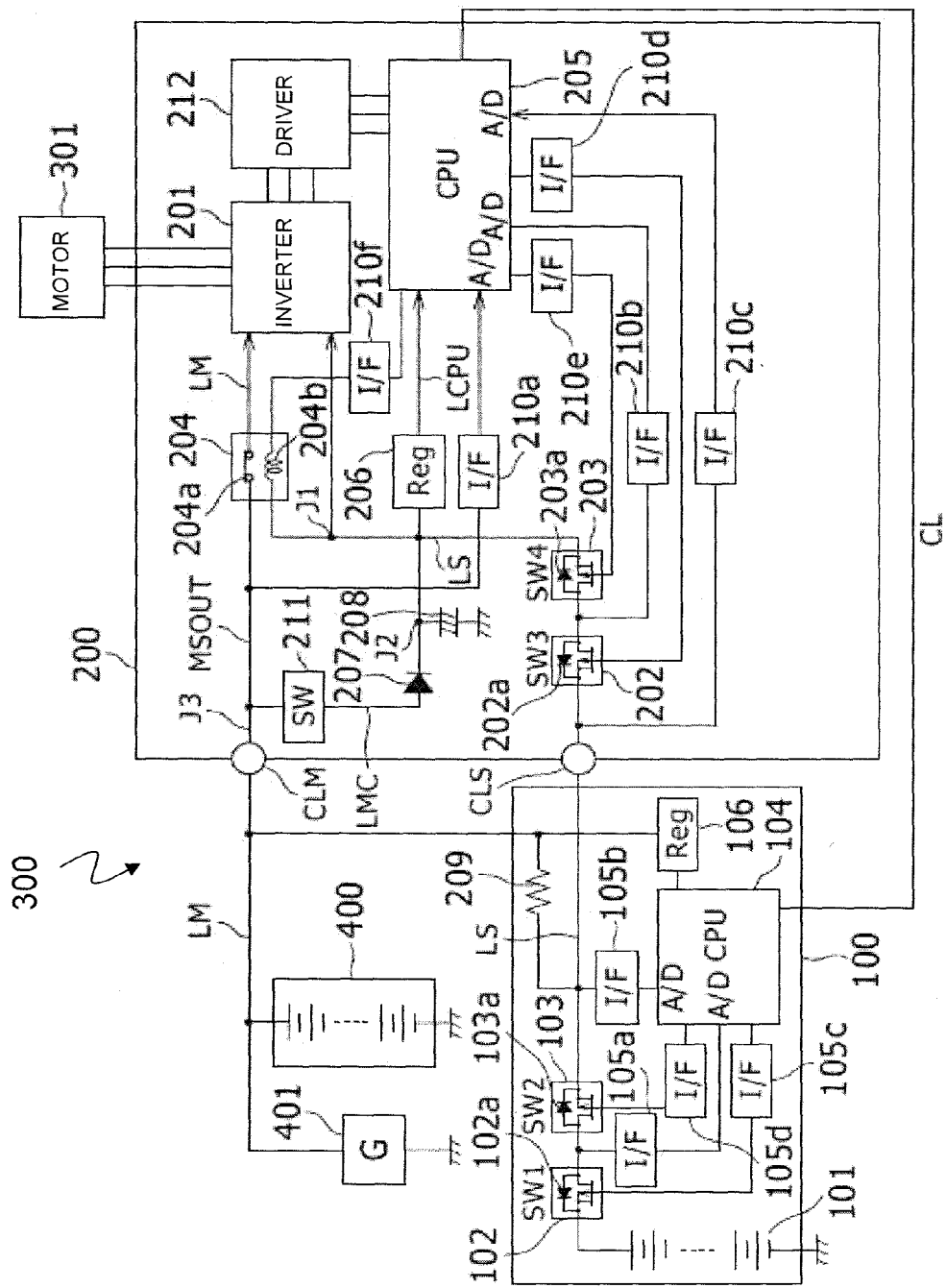
FIG. 7 is a diagram of a modification example of the control device according to the present invention.

Moreover, in the control device shown in FIG. 7, main power supply line LM and sub power supply line LS between second MOSFET 103 and third MOSFET 202 are connected via resistance 209, to apply a bias voltage to sub power supply line LS between second MOSFET 103 and third MOSFET 202.

In the control device, the MOSFET is used as the semiconductor switch. However, another FET such as a JFET or a MESFET can be used as the semiconductor switch.

Figure 8:
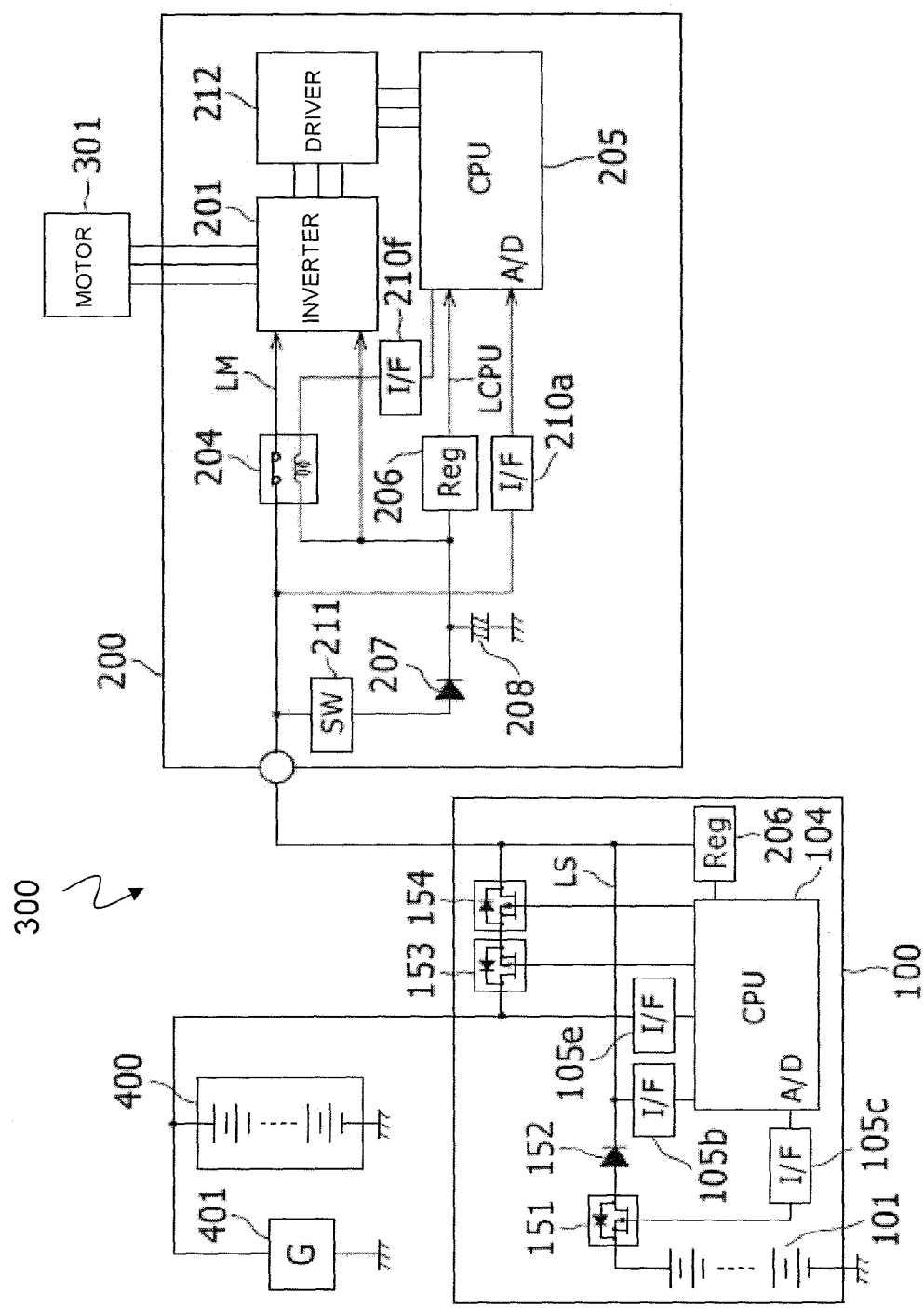
FIG. 8 is a diagram of a reference example of the control device including a power supply unit and a control unit.

FIG. 8 is a diagram showing a reference example of a control device 300 that includes a power supply unit 100 including a sub power supply 101 and a control unit 200, which supplies power from power supply unit 100 to an inverter 201. Elements the same as in the control device shown in FIG. 1 are denoted by the same reference symbols.

In the control device shown in FIG. 8, a sub power supply line LS is provided in power supply unit 100, and sub power supply line LS is provided in parallel with a main power supply line LM, which serially connects a relay 204 and a main power supply 400 with each other. On the other hand, a series circuit formed of a third MOSFET 153 and a fourth MOSFET 154, which is serially connected to main power supply line LM, is provided in power supply unit 100. Here, a drain of the fourth MOSFET 154 is connected to a drain of third MOSFET 153 to serially connect the third and fourth MOSFETs.

Moreover, a series circuit formed of a first MOSFET 151 and a diode 152, which is serially connected to sub power supply line LS, is provided in power supply unit 100. Here, first MOSFET 151 is serially connected to sub power supply line LS by connecting a source thereof to the sub power supply 101, and diode 152 is set to cause electric current to flow from sub power supply 101 toward control unit 200.

In the configuration shown in FIG. 8, third MOSFET 153 and fourth MOSFET 154 incorporated in power supply unit 100 are interposed in a line for supplying power of main power supply 400 to inverter 201. Consequently, a MOSFET having a large capacity needs to be used. Here in the MOSFET having a large capacity, a heat sink for heat dissipation becomes large, and hence, power supply unit 100 also becomes large.

On the other hand, in the control device 300 according to the present invention shown in FIG. 1, FIG. 6, and FIG. 7, third MOSFET 202 and fourth MOSFET 203 interposed in the line for supplying power of main power supply 400 to inverter 201 are incorporated in control unit 200. Moreover, the semiconductor switch that switches over power supply from main power supply 400 is not included in power supply unit 100. Therefore downsizing and cost reduction of power supply unit 100 is possible, and general versatility of power supply unit 100 can be increased.

The entire contents of Japanese Patent Application No. 2010-210755, filed Sep. 21, 2010, are incorporated herein by reference.

While only a select embodiment have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention, the invention as claimed in the appended claims and their equivalents.

What is claimed is:

1. A control device comprising a power supply unit and a control unit externally connected to the power supply unit,
the power supply unit including:
a sub power supply;
a sub power supply line that connects the sub power supply to a load;
a first semiconductor switch serially connected to the sub power supply line by connecting a source thereof to the sub power supply;
a second semiconductor switch serially connected to the sub power supply line by connecting a drain thereof to a drain of the first semiconductor switch; and
a sub control unit that controls on/off of the first semiconductor switch and the second semiconductor switch, and monitors a drain voltage between the first semiconductor switch and the second semiconductor switch and a source voltage of the second semiconductor switch, to thereby perform fault diagnosis, and the control unit including:
a sub power supply line connected to the sub power supply line of the power supply unit to connect the sub power supply to the load;
a third semiconductor switch serially connected to the sub power supply line by connecting a source thereof to the sub power supply;
a fourth semiconductor switch serially connected to the sub power supply line by connecting a drain thereof to a drain of the third semiconductor switch;
a main power supply line that connects a main power supply separate from the sub power supply to the load and is provided in parallel with the sub power supply line;
a relay provided in the main power supply line; and
a main control unit that controls on/off of the relay, the third semiconductor switch, and the fourth semiconductor switch, and monitors a drain voltage between the third semiconductor switch and the fourth semiconductor switch and a source voltage of the third semiconductor switch, to thereby perform fault diagnosis.

2. A control device according to claim 1, wherein the sub control unit diagnoses the presence of a short-circuit fault in the first semiconductor switch based on the voltage between the first semiconductor switch and the second semiconductor switch in a state in which the first semiconductor switch and the second semiconductor switch are both off.

3. A control device according to claim 1, wherein a circuit that applies a bias voltage to the sub power supply line between the second semiconductor switch and the third semiconductor switch, is provided in either one of the power supply unit and the control unit.

4. A control device according to claim 3, wherein the sub control unit
diagnoses a fault in the sub power supply line between the second semiconductor switch and the third semiconductor switch, based on the source voltage of the second semiconductor switch, and
controls on/off of the first semiconductor switch and the second semiconductor switch in order to diagnose a fault, and diagnoses the presence of a fault in the first semiconductor switch and the second semiconductor switch based on the drain voltage between the first semiconductor switch and the second semiconductor switch in the control state.

5. A control device according to claim 4, wherein the sub control unit, in a case in which the occurrence of an open circuit fault is determined in at least one of the first semiconductor switch and the second semiconductor switch, holds the first semiconductor switch and the second semiconductor switch off, and outputs a signal requesting to hold the third semiconductor switch and the fourth semiconductor switch off, to the main control unit.

6. A control device according to claim 4, wherein the sub control unit, in a case in which the occurrence of a ground fault in the sub power supply line is determined, holds the first semiconductor switch and the second semiconductor switch off.

7. A control device according to claim 3, wherein
the sub control unit diagnoses a fault in the sub power supply line between the second semiconductor switch and the third semiconductor switch, based on a source voltage of the second semiconductor switch, and transmits the diagnosis result to the main control unit,
the main control unit diagnoses a fault in the sub power supply line between the second semiconductor switch and the third semiconductor switch based on a source voltage of the third semiconductor switch, and transmits the diagnosis result to the sub control unit, the sub control unit, in a case in which the occurrence of a ground fault in the sub power supply line is determined by at least one of the sub control unit and the main control unit, holds the first semiconductor switch and the second semiconductor switch off, and the main control unit, in a case in which the occurrence of a ground fault in the sub power supply line is determined by at least one of the sub control unit and the main control unit, holds the third semiconductor switch and the fourth semiconductor switch off.

8. A control device according to claim 3, wherein the main control unit diagnoses a fault in the sub power supply line between the second semiconductor switch and the third semiconductor switch, based on a source voltage of the third semiconductor switch, and controls on/off of the third semiconductor switch and the fourth semiconductor switch in order to diagnose a fault, and diagnoses the presence of a fault in the third semiconductor switch and the fourth semiconductor switch based on the drain voltage between the third semiconductor switch and the fourth semiconductor switch in the control state.

9. A control device according to claim 8, wherein the main control unit, in a case in which the occurrence of an open circuit fault is determined in at least one of the third semiconductor switch and the fourth semiconductor switch, holds the third semiconductor switch and the fourth semiconductor switch off, and outputs a signal requesting to hold the first semiconductor switch and the second semiconductor switch off, to the sub control unit.

10. A control device according to claim 8, wherein the main control unit, in a case in which the occurrence of a ground fault in the sub power supply line is determined, holds the third semiconductor switch and the fourth semiconductor switch off.

11. A control device according to claim 1, wherein the main control unit, when the main power supply is connected to the load, holds the third semiconductor switch in an on state.

12. A control device according to claim 1, wherein the sub control unit and the main control unit monitor the voltage level via an A/D converter.

13. A control device according to claim 1, wherein the load is an inverter that drives a motor.

14. A control device according to claim 1, wherein the main power supply is a battery, and the sub power supply is a capacitor.

15. A control device according to claim 1, wherein the first semiconductor switch, the second semiconductor switch, the third semiconductor switch, and the fourth semiconductor switch are MOSFETs provided with a parasitic diode.

16. A control device comprising a power supply unit and a control unit externally connected to the power supply unit, the power supply unit including:
a sub power supply;
a sub power supply line for connecting the sub power supply to a load;
a first semiconductor switch serially connected to the sub power supply line, that is switched on to cause a current to flow between a source and a drain;
a second semiconductor switch serially connected to the power supply line on a load side of the first semiconductor switch, that is switched on to cause a current to flow between a source and a drain, and is switched off to cause a discharge current to flow from the sub power supply by a parasitic diode; and a sub control unit that controls on/off of the first semiconductor switch and the second semiconductor switch, and monitors a voltage between the first semiconductor switch and the second semiconductor switch, and a voltage on a load side of the second semiconductor switch, to diagnosis a fault of the first semiconductor switch and the second semiconductor switch, and a fault of a power supply drain on a load side of the second semiconductor switch, and the control unit including:
a sub power supply line connected to the power supply line of the power supply unit and connected to the load;
a third semiconductor switch serially connected to the sub power supply line, that is switched on to cause a current to flow between a source and a drain, and is switched off to cause a current to flow towards the control unit side via a parasitic diode;
a fourth semiconductor switch serially connected to the sub power supply line on a load side of the third semiconductor switch, that is switched on to cause a current to flow between a source and a drain, and is switched off to cause a discharge current to flow from the power supply unit side via a parasitic diode;
a main power supply line serving as a power supply line that connects a main power supply provided separate from a sub power supply of the power supply unit, to the load, and which is provided in parallel with the sub power supply line;
a relay provided in the main power supply line; and
a main control unit that controls on/off of the relay, the third semiconductor switch, and the fourth semiconductor switch, and monitors a voltage between the third semiconductor switch and the fourth semiconductor switch and a voltage on the power supply unit side of the third semiconductor switch, to diagnose a fault in the third semiconductor switch and the fourth semiconductor switch, and a fault in a sub power supply line on a power supply unit side of the third semiconductor switch, the sub control device and the main control device controlling the first semiconductor switch, the second semiconductor switch, the third semiconductor switch, the fourth semiconductor switch, and the relay, to thereby connect either one of the sub power supply and the main power supply to the load.

17. A control device according to claim 16, wherein a circuit that applies a bias voltage between the second semiconductor switch and the third semiconductor switch, is provided in either one of the power supply unit and the control unit.

18. A control device which supplies power of a main power supply to a load, comprising:
a power supply unit which includes a sub power supply; and
a control unit which supplies power of the main power supply or the sub power supply to the load, the control unit being provided separately from the power supply unit, the power supply unit further including a first semiconductor switch and a second semiconductor switch serially connected to a sub power supply line for connecting the sub power supply to the load, the control unit including a third semiconductor switch and a fourth semiconductor switch serially connected to the sub power supply line, and the power supply unit and the control unit holding all of the first semiconductor switch, the second semiconductor switch, the third semiconductor switch, and the fourth semiconductor switch in an OFF-state, when an abnormality of a voltage applied to the sub power supply line between the second semiconductor switch and the third semiconductor switch, occurs.

* * * * *